United States Patent [19]

Stocklin

[11] 4,255,797

[45] Mar. 10, 1981

[54] SONIC ATTENUATION SYSTEM

[75] Inventor: Philip L. Stocklin, Norwich, Conn.

[73] Assignee: Raytheon Company, Lexington, Mass.

[21] Appl. No.: 816,231

[22] Filed: Jul. 5, 1977

[51] Int. Cl.³ .......................... H04K 3/00; G01S 3/80
[52] U.S. Cl. .......................................... 367/1; 367/92; 367/2; 367/100; 367/103
[58] Field of Search ...................... 340/3 R, 3 E, 5 D; 367/1, 2, 92, 100

[56] References Cited

U.S. PATENT DOCUMENTS

| 3,824,531 | 7/1974 | Walsh | 340/3 R |
| 3,882,444 | 5/1975 | Robertson | 340/3 R |

*Primary Examiner*—Richard A. Farley
*Attorney, Agent, or Firm*—Martin M. Santa; Joseph D. Pannone; Milton D. Bartlett

[57] ABSTRACT

A beam of sound, of sufficient amplitude for inducing a finite amplitude effect in water, is directed into a field of sound for interaction therewith to produce intermodulation products. Energy is removed from the sound field in the formation of the intermodulation products resulting in an attenuation of sound in the sound field.

1 Claim, 1 Drawing Figure

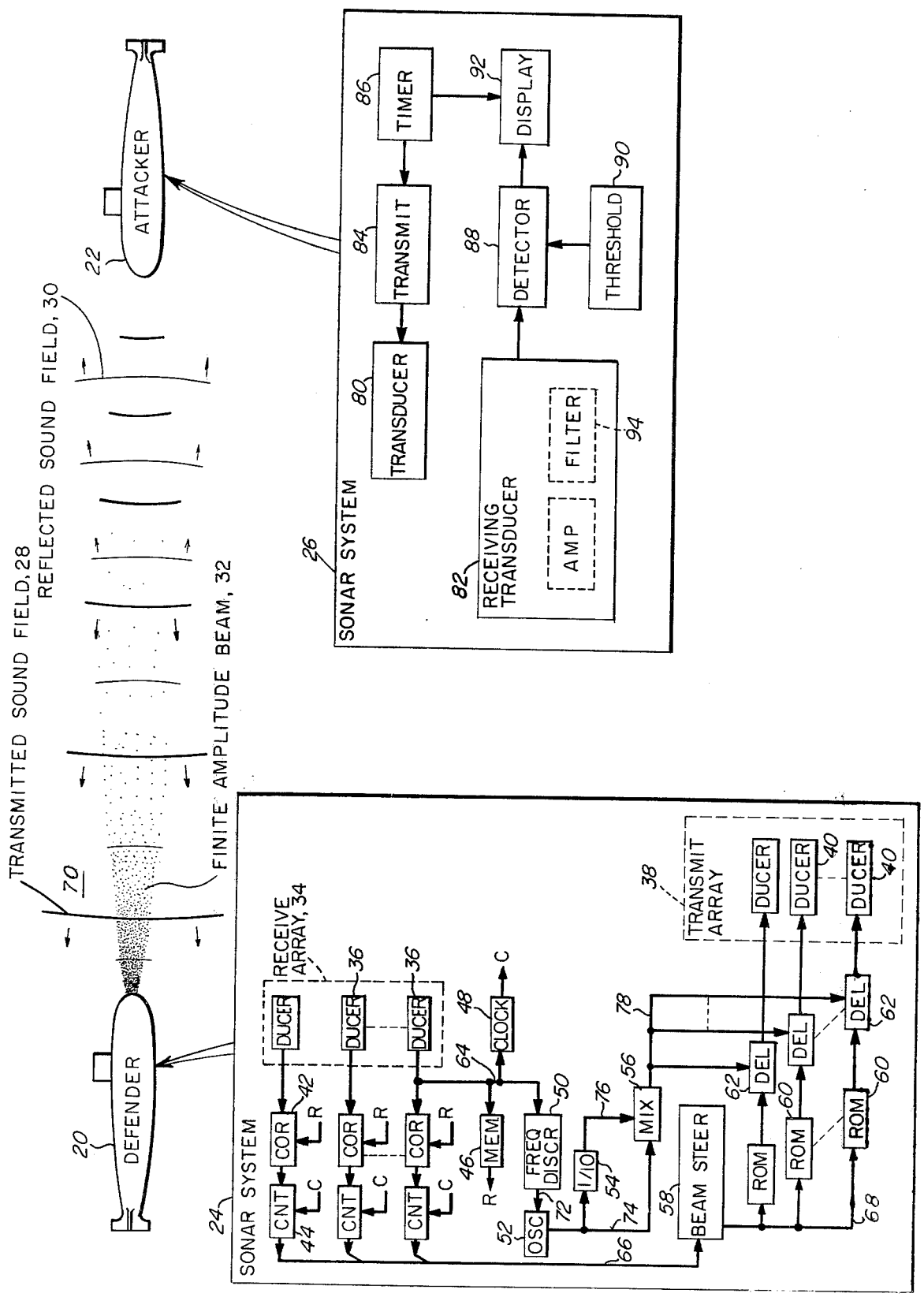

SONIC ATTENUATION SYSTEM

BACKGROUND OF THE INVENTION

Sonar is used in military situations for measuring the range and direction of a target. For protection of the target, sound-absorbing materials and special construction techniques have been employed to reduce the magnitude of echoes so that the target may escape detection. The foregoing protective techniques have a disadvantage in that they may preclude certain forms of construction of watercraft that are suited for offensive naval maneuvers.

SUMMARY OF THE INVENTION

The disadvantage of the foregoing protective techniques are overcome and other advantages are provided by a sonic attenuation system which, in accordance with the invention, provides for a sound generator which directs a beam of sound into a field of sound produced by an enemy sonar, the beam of sound having sufficient amplitude to induce a nonlinear finite amplitude effect between sound waves of the beam of sound and sound waves of the sound field. The finite amplitude interaction results in intermodulation products between sound waves of the beam and of the field. Energy is removed from the sound field in the formation of the inter-modulation products resulting in an attenuation of sound in the sound field. The invention also contemplates the attenuation of sound in nonmilitary applications such as the attenuation of sound having specific frequencies in a closed vessel.

BRIEF DESCRIPTION OF THE DRAWING

The aforementioned aspects and other features of the invention are explained in the following description taken in connection with the accompanying drawing wherein the FIGURE shows a sonar system for attenuating sonic echoes received by an enemy ship.

DESCRIPTION OF THE PREFERRED EMBODIMENT

Referring now to the FIGURE there are seen two sub-marines 20 and 22, the former being the defender or target submarine and containing a sonar system 24, indicated diagrammatically, while the submarine 22 is the attacker and contains a sonar system 26, also indicated diagrammatically. The attacker submarine 22 with its sonar system 26 transmits an acoustic echo ranging signal 28 which reflects from the defender submarine 20 as echoes 30. The defender submarine 20 with its sonar system 24 senses the direction of the signal 28 and transmits a finite amplitude beam 32 in the direction of the reflected echo ranging signal 28 so as to propagate colinearly with the echo 30. It is to be noted that the submarines 20 and 22 are used only as examples and that, in lieu of the submarine 20 or the submarine 22, any platform capable of mounting the sonar system 24 or the sonar system 26 may be utilized.

The system 24 comprises a receiving array 34 of transducers 36, a transmitting array 38 of transducers 40, correlators 42, counters 44, a memory 46, a clock 48, a frequency discriminator 50, an oscillator 52, a frequency divider 54, a mixer 56, a beam-steering unit 58, read-only memories 60 and delay units 62. Sonic signals received by the transducers 36 are processed by the correlators 42 to determine the relative times of arrival of the sonic signal at each of the transducers 36, the differences in the times of arrival serving to identify the direction of arrival of the signal 28 relative to the array 34.

In operation, a reference signal, R, is provided by the memory 46 which is seen coupled via line 64 to one of the transducers 36 for storing a sample of the signal received by that transducer 36. Thereafter, the stored sample is provided by the memory as the reference, R, for each of the correlators 42. The clock 48 is strobed by the signal on line 64 to begin transmitting clock pulses at terminal C to each of the counters 44. The counters 44 count the clock pulses, C, until stopped by signals coupled thereto from respective ones of the correlators 42, the stopping of the count signifying the times of arrival of the signals at the respective transducers 36. The counts of the counter 44 are coupled via line 66 to the beam steering unit 58 which senses the differences between the counts of the counters 44, these differences representing the relative delays between the times of incidence of the signal 28 upon respective ones of the transducers 36. Since the differences in times of arrival of the signal 28 to the transducers 36 is a measure of the direction of a wavefront of the signal 28 relative to the array 34, the beam steering unit 58, in response to the counts on line 66, provides a digital number on line 68 which represents the direction of the wavefront of the signal 28 relative to the array 34.

The blocks in the FIGURE representing the transducers 36 are understood to include preamplifiers and filters as are customarily applied in sonar systems. Similarly, the blocks representing the transducers 40 are understood to include power amplifiers and filters as are customarily utilized for generating a beam of sound, the amplifiers providing sufficient intensity for the sound beam 32 to provide a finite amplitude effect in the water 70 of the ocean surrounding the submarine 20. For the desired finite amplitude effect to be produced most effectively, it has been found that a difference in frequency of greater than approximately ±10% between the frequencies of two colinear sound beams results in the desired nonlinear reaction for the production of sum and difference frequencies. The two colinear sound beams in the FIGURE are the finite amplitude beam 32, which serves as the pump beam, and the echo 30 which propagates away from the defender submarine 20 in the same direction as the beam 32 since the beam 32 is steered by the sonar system 24 so as to be colinear with the echoes 30. It is to be noted that the sum and difference frequencies should lie outside the receiving band of the sonar system 26 of the attacker submarine 22; otherwise their presence will be detected as a modulation of the echo 30.

In order to produce the desired frequency for the pump beam 32, the discriminator 50 senses the signal on line 64 to produce a control signal on line 72 having a magnitude representing the magnitude of the frequency of the signal on line 64. The control signal on line 72 adjusts the frequency of oscillation of the oscillator 52 so that the oscillator 52 produces on line 74 a continuous sinusoid or square wave signal having a frequency equal to the frequency of the signal on line 64. The divider 54, which typically comprises a counter which counts 10 periods of the signal on line 74 and then resets itself, produces a square wave signal on line 76 having a frequency equal, by way of example, to one-tenth the frequency of the signal on line 74. If a frequency difference of 20% is desired, the counter of the divider 54 would be adjusted to count only five periods before resetting. The signals on line 74 and 76 are combined in the mixer 56 to produce a signal on line 78 which differs in frequency by 10% from the frequency of the signal on line 74. The signal on line 78 is coupled to each of the delay units 62 for transmittal by the transducers 40 into the water 70.

The memories 60 each store a set of numbers which serve as addresses for controlling the delays of the respective delay units 62. In response to the signal on line 68, each memory 60 operates its corresponding delay unit 62 to delay the signal on line 78 by a suitable amount for forming a beam of acoustic energy, namely the beam 32, with a relatively narrow beamwidth and in the direction of propagation opposite the direction of the signal 28. Since the echo 30 radiates outwardly from the forward part of the submarine 20 in a direction opposite that of the incoming signal 28, the beam 32, as noted above, is directed colinearly and in the same direction as the echo 30 to provide the desired finite amplitude interaction therewith.

The sonar system 26 of the attacker submarine 22 comprises a transmitting transducer 80, a receiving transducer 82, a transmitter 84, a timer 86, a detector 88, a source 90 of a threshold signal, and a display 92. The timer 86 provides timing signals to the transmitter for the transmission of the echo ranging signals 82 via the transducer 80, the timer 86 also providing timing signals to the display 92 for indicating the range of the submarine 20 which is obtained by a measure of the time elapsed between the transmission of the signal 28 by the transducer 80 and the reception of the echo 30 by the transducer 82. The detector 88 compares signals received by the transducer 82 to a threshold reference signal provided by the source 90 to determine the presence of an echo signal. Upon detecting an echo signal, the detector 88 signals the display 92 for presenting the range of the submarine 20. In the FIGURE, the block labeled 82 is understood to include preamplifiers and filters as are commonly employed in sonar receiving systems for amplifying a received signal to a suitable level for operation of the detector 88.

Thus, in the typical naval warfare situation, the attacker submarine 22 transmits sonar signals 28 for detecting the presence of the submarine 20, this presence being indicated by the reception of the echoes 30. The range of the submarine 20 relative to the submarine 22 is provided, as noted hereinabove by the sonar system 26. In addition, the sonar system 26 may incorporate direction finding equipment analogous to that disclosed for the system 24 for determining the direction of the submarine 20. Upon locating the submarine 20, the attacking submarine 22 is then able to deploy weapons for disabling the submarine 20.

In accordance with the invention, the submarine 20 is able to defend itself by attenuating the echo 30 incident upon the sonar system 26, this attenuation being accomplished by the deployment of the finite amplitude sonar beam 32 so that the beam 32, as disclosed hereinabove, propagates along the same propagation path as the echo 30 for interacting therewith. The nonlinear finite amplitude interaction between the beam 32 and the echoes 30 results in intermodulation products having frequencies different from those of the echo 30 to which the passband of a filter 94 of the transducer 82 is tuned. Accordingly, the sonar system 26 is not responsive to these intermodulation products. Furthermore, any acoustic energy remaining at the frequency of the echo 30 is of greatly reduced amplitude from that of the echo 30 in the absence of the finite amplitude interaction so that any echoes 30 received by the transducer 82 are of lower amplitude than the threshold reference signal of the source 90 and therefore are rejected by the detector 88 as being echo signals. Thus, the attacker submarine 22 is unable to locate the defender submarine 20. In addition, it is noted that since the frequency of the beam 32 differs from that of the echo 30 by the aforementioned factor of 10% or more, the submarine 22 may not observe the beam 32 since its sonar system is tuned to a different frequency, this providing further security for the defender submarine 20.

It is understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A sonar system comprising:
   means for detecting the direction of a sound wave, said detecting means including means for detecting a frequency of said sound wave;
   means for transmitting a beam of acoustic energy of sufficient intensity to induce a nonlinear finite amplitude interaction;
   said transmitting means including means for steering said beam, and means coupled to said frequency detection means for providing a transmitting frequency offset from said frequency of said sound wave; and
   means coupled between said detecting means and said steering means for signaling said steering means to steer said beam in a direction opposite said detected direction of said sound wave for inducing a nonlinear finite amplitude interaction between said beam and said sound wave.

* * * * *